(12) United States Patent
Tanaka et al.

(10) Patent No.: US 6,329,735 B1
(45) Date of Patent: *Dec. 11, 2001

(54) COMMUTATOR MOTOR

(75) Inventors: Toshinori Tanaka; Kazuhisa Takashima; Kyouhei Yamamoto, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/440,473

(22) Filed: Nov. 15, 1999

(30) Foreign Application Priority Data

Apr. 30, 1999 (JP) .................................. 11-123917

(51) Int. Cl.[7] ................................... H02K 13/00
(52) U.S. Cl. ............................... 310/239; 310/89
(58) Field of Search ...................... 310/239, 80, 89, 310/154.01, 242; 180/443

(56) References Cited

U.S. PATENT DOCUMENTS

| | | | |
|---|---|---|---|
| 3,898,493 | * 8/1975 | Schaffer | 310/247 |
| 4,538,085 | * 8/1985 | Tanaka | 310/239 |
| 4,629,024 | * 12/1986 | Buike et al. | 180/444 |
| 4,707,630 | * 11/1987 | Tomite et al. | 310/154 |
| 5,015,897 | * 5/1991 | Inagaki et al. | 310/83 |
| 5,810,111 | * 9/1998 | Takeuchi et al. | 180/443 |

FOREIGN PATENT DOCUMENTS

| | | | |
|---|---|---|---|
| 2621750A3 | * 10/1988 | (FR) . | |
| 2004130A | * 3/1979 | (GB) . | |
| 2154375A | * 9/1985 | (GB) . | |
| 7-21085 | 5/1995 | (JP) | H02K/5/14 |
| 09215254A | * 8/1997 | (JP) . | |

* cited by examiner

Primary Examiner—Joseph Waks
(74) Attorney, Agent, or Firm—Sughrue, Mion, Zinn, Macpeak & Seas, PLLC

(57) ABSTRACT

A commutator motor includes a cylindrical yoke, magnets disposed opposite each other inside the yoke, a shaft disposed on the central axis of the yoke so as to rotate freely, an armature secured to the shaft, a commutator secured to one end of the shaft, brushes placed in contact with the surface of the commutator by the elastic force of springs, a brush holder for holding the brushes, and a housing mounted to the yoke, the brush holder being supported on the housing by an elastic body, and an elastic member for positioning the central axis of the brush holder so as to be aligned with the central axis of the shaft being disposed between the housing and the brush holder.

11 Claims, 10 Drawing Sheets

COMMUTATOR MOTOR

BACKGROUND OF THE INVENTION

1. Field of the Invention

The present invention relates to a commutator motor used as a motor for an electric power steering assembly for assisting the steering force of an automotive steering wheel, for example.

2. Description of the Related Art

FIG. 10 is a perspective showing use of a motor for an electric power steering assembly which is a conventional commutator motor. This commutator motor 1 is connected to a gear box 3 mounted to the end of a column 2.

FIG. 11 is a lateral section of the commutator motor 1. This commutator 1 includes: a cylindrical yoke 4; 4-pole magnets 6 disposed opposite each other inside the yoke 4 and held by a magnet holder 5 shown in FIG. 12; a shaft 9 supported at one end by a first bearing 8 housed in a bearing housing portion 7 of the yoke 4 so as to rotate freely; an armature 10 secured to the shaft 9; a commutator 11 secured to one end of the shaft 9; brushes 13 placed in contact with the surface of the commutator 11 by the elastic force of springs 12; a brush holder 14 for holding the brushes 13; a housing 16 integrated with the yoke 4 by a bolt 15; a bolt 17 securing the brush holder 14 to the housing 16 by means of an elastic body 100 which is rubber; a second bearing 18 secured to a central portion of the housing 16 for supporting the other end of the shaft 9 so as to rotate freely; and a grommet 21 through which a lead wire 20 passes connected by welding to metal fittings (not shown) whose tips are insertion molded into the brush holder 14.

The armature 10 includes: a core 22 having a plurality of slots extending in the axial direction; and a winding 23 constructed by winding wire into the slots by a lap-winding method.

The magnet holder 5 includes: four stanchion portions having a plurality of protrusions 31 for holding the magnets 6; and an engaging portion 32 formed on a radially inner portion of the magnet holder for engaging a recess (not shown) in the brush holder 14.

In a commutator motor 1 of the above construction, the armature 10 is rotated together with the shaft 9 due to electromagnetic action by supplying electric current from the lead wire 20 to the winding 23 by means of the brushes 13 contacting the commutator segments 11. The torque of the shaft 9 is transmitted to a shaft 24 spline fitted to a boss 19 secured to the shaft 9, and serves to assist the steering force acting on the steering wheel 25.

The commutator motor 1 is mounted to a mounting seat 33 close to the vehicle cab, requiring strict noise prevention. Vibrations transmitted from the gear box 3 side are transmitted through the shaft 24 and the housing 16 to the brush holder 14, which causes the brushes 13 to vibrate, giving rise to brush noise, and the brush holder 14 is also supported on the housing 16 by means of the elastic body 100 in order to prevent the sliding noise of the brushes 13 from being transmitted from the brush holder 14 through the housing 16 to the gear box 3 side or to the yoke 4. That is to say, the brush holder 14 is rubber mounted.

However, in a commutator motor 1 of the above construction, one problem has been that since the lead wire 20 passes through the grommet 21 and extends outside as shown in FIG. 13, the brush holder 14 held by the elastic body 100 may be displaced from center or be tilted relative to the shaft 9 by movement of the lead wire 20 which is connected to the metal fittings inside the brush holder or during installation of the brush holder 14, making contact between the brushes 13 and the commutator 11 uneven, causing the performance of the commutator motor 1 to deteriorate (for example, rotational frequency and rotational torque may be different in the clockwise and counterclockwise directions), and shortening the working life of the brushes 13 and increasing brush noise. This problem is particularly serious in the case of a motor for an electric power steering assembly which rotates in both directions.

Another problem has been that although the brush holder 14 is supported on the housing 16 by means of the elastic body 100, because the brush holder 14 is positioned by the engaging portion 32 of the magnet holder 5, vibrations from outside, for example, may be transmitted to the brush holder 14 through the yoke 4, the magnets 6, and the magnet holder 5, which causes the brushes 13 to vibrate, giving rise to brush noise.

An additional problem has been that because the first bearing 8 is housed in the bearing housing portion 7 of the yoke 4, if there is any clearance between the bearing housing portion 7 and the first bearing 8, the first bearing 8 may knock against the inner wall of the bearing housing portion 7 when the armature 10 rotates, giving rise to impact noises, and brush noise may increase due to rattling of the armature 10.

SUMMARY OF THE INVENTION

The present invention aims to solve the above problems and an object of the present invention is to provide a commutator motor enabling prevention of displacement of a brush holder held in a housing by means of an elastic body, reductions in noise, and further improvements to the effectiveness of the rubber mount for the brush holder.

To this end, according to the present invention, there is provided a commutator motor comprising: a cylindrical yoke; magnets disposed opposite each other inside said yoke; a shaft disposed on the central axis of the yoke so as to rotate freely; an armature secured to the shaft; a commutator secured to one end of the shaft; brushes placed in contact with the surface of the commutator by the elastic force of springs; a brush holder for holding the brushes; and a housing mounted to the yoke, the brush holder being supported on the housing by means of an elastic body, and an elastic member for positioning the central axis of the brush holder so as to be aligned with the central axis of the shaft being disposed between the housing and the brush holder.

DETAILED DESCRIPTION OF THE PREFERRED EMBODIMENTS

Embodiment 1

A commutator motor according to the present invention will now be explained, and parts the same as or corresponding to those of the conventional example will be given the same numbering.

Figure 1:
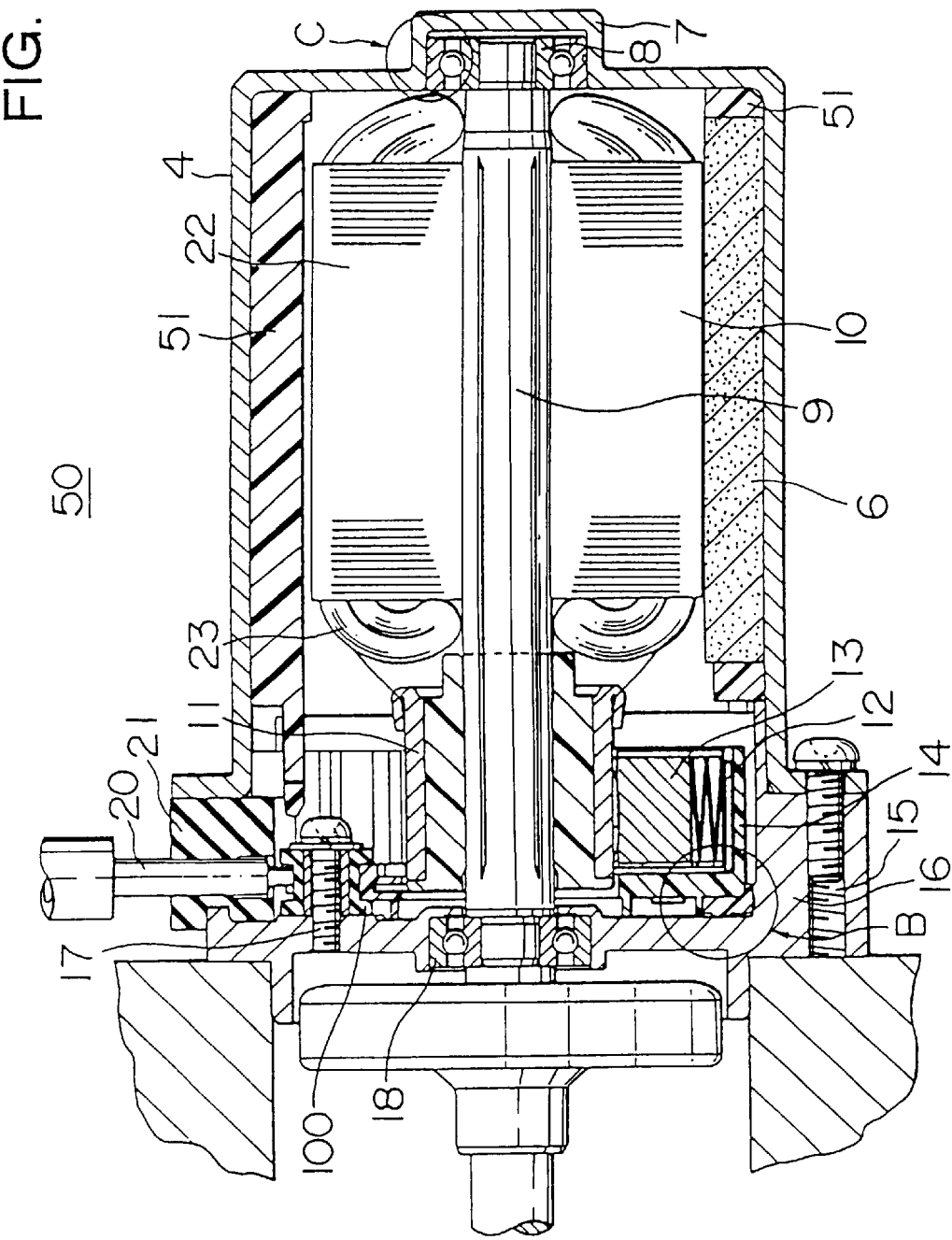
FIG. 1 is a lateral section of a commutator motor according to Embodiment 1 of the present invention.
Figure 2:
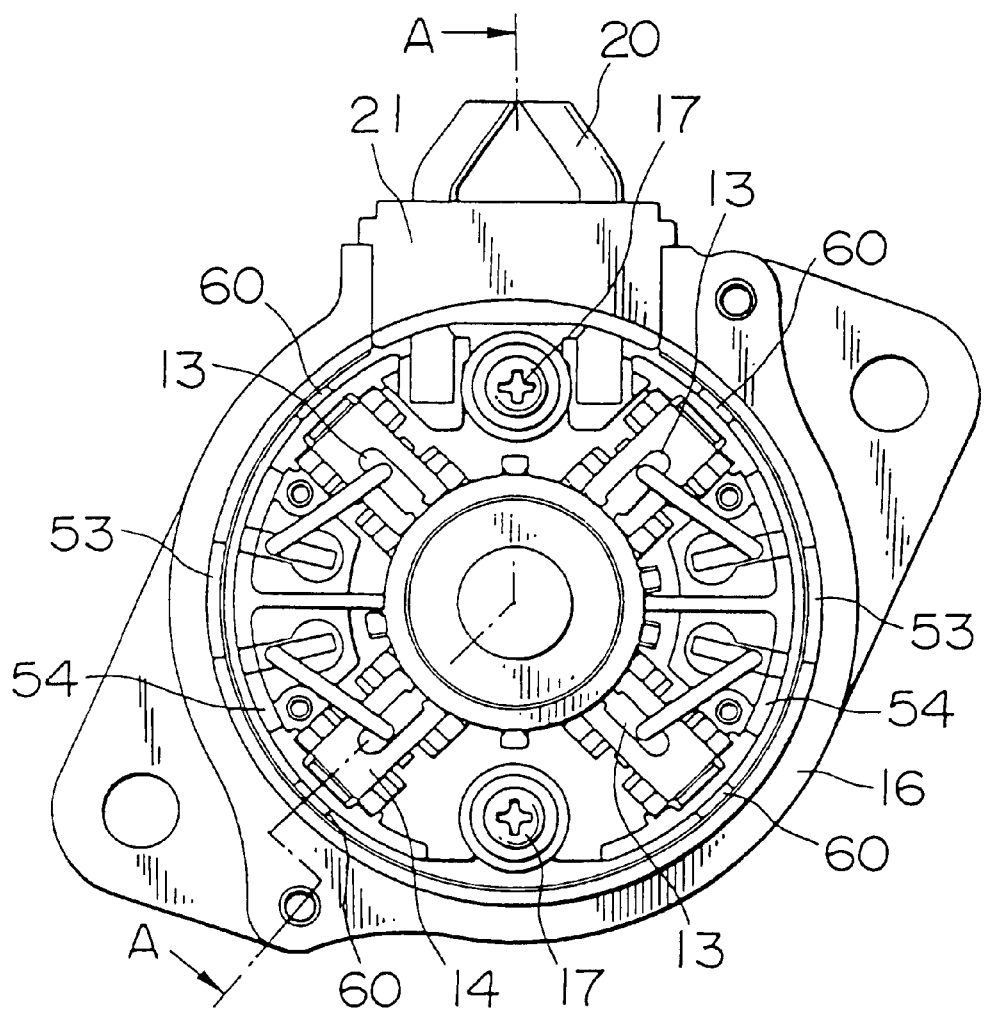
FIG. 2 is a partial front elevation of FIG. 1.

FIG. 1 is a lateral section of a commutator motor 50 according to Embodiment 1 of the present invention, and FIG. 2 is a front elevation of the brushes, brush holder, housing, etc., in FIG. 1. Moreover, the cross-section of the brush holder and its vicinity in FIG. 1 is a cross-section taken along line A—A in FIG. 2.

Figure 3:
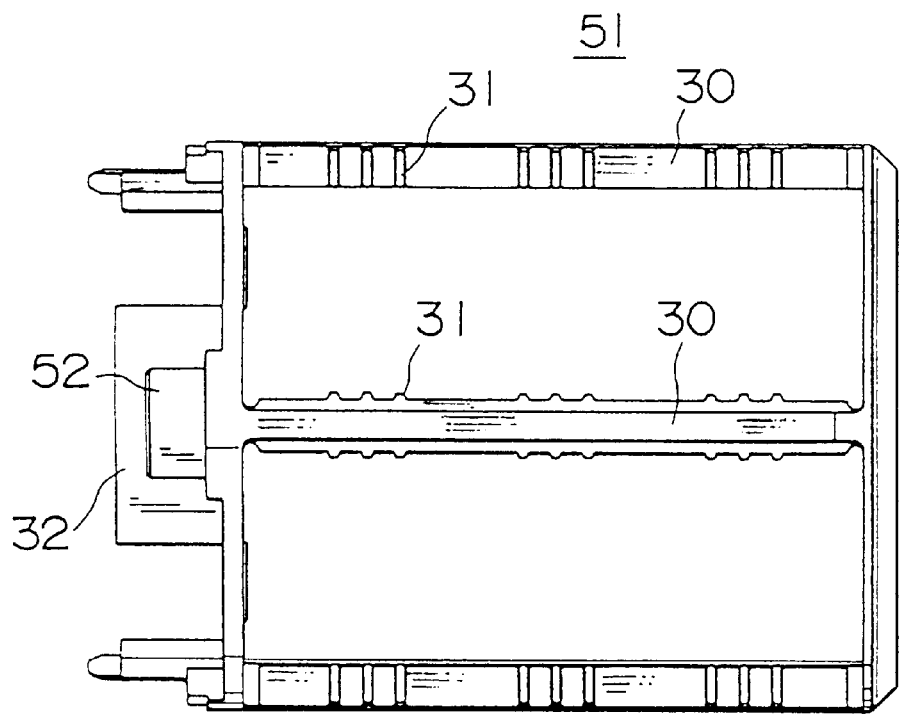
FIG. 3 is a side elevation of the magnet holder in FIG. 1.

The commutator motor 50 which is used in an electric power steering assembly includes: a cylindrical yoke 4; 4-pole magnets 6 disposed opposite each other inside the yoke 4 and held by a magnet holder 51 shown in FIG. 3; a shaft 9 supported at one end by a first bearing 8 housed in a bearing housing portion 7 of the yoke 4 so as to rotate freely; an armature 10 secured to the shaft 9; a commutator 11 secured to one end of the shaft 9; brushes 13 placed in contact with the surface of the commutator 11 by the elastic force of springs 12; a brush holder 14 for holding the brushes 13; a housing 16 integrated with the yoke 4 by a bolt 15; a bolt 17 securing the brush holder 14 to the housing 16 by means of elastic bodies 100 composed of rubber; a second bearing 18 secured to a central portion of the housing 16 for supporting the other end of the shaft 9 so as to rotate freely; a lead wire 20 connected by welding to metal fittings (not shown) whose tips are insertion molded into the brush holder 14; and a grommet 21 through which the lead wire 20 passes.

The armature 10 includes: a core 22 having a plurality of slots extending in the axial direction; and a winding 23 constructed by winding wire into the slots by a lap-winding method.

The magnet holder 51 includes: four stanchion portions having a plurality of protrusions 31 for holding the magnets 6; and a pair of engaging portion 52 formed on mutually opposite sides of a radially outer portion for engaging receiving portions of the housing 16.

Figure 4:
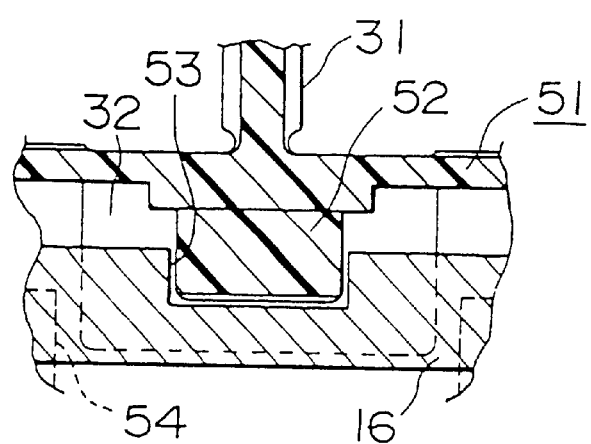
FIG. 4 is a diagram explaining the engagement of the magnet holder and the housing in FIG. 1.

Because the magnet holder 51 engages the receiving portions 53 of the housing 16 as shown in FIG. 4, the magnet holder 51 is prevented from rotating relative to the housing 16. Moreover, an engaging portion 32 is also formed on a radially inner portion of the magnet holder 51 as in the conventional example, the space between the engaging portion 32 and the receiving portions 54 of the brush holder 14 being sufficiently large that vibrations are not transmitted from the magnet holder 51 to the brush holder 14. This magnet holder 51 can be used as a shared part to engage the brush holder 14 and to engage the housing 16.

Figure 5:
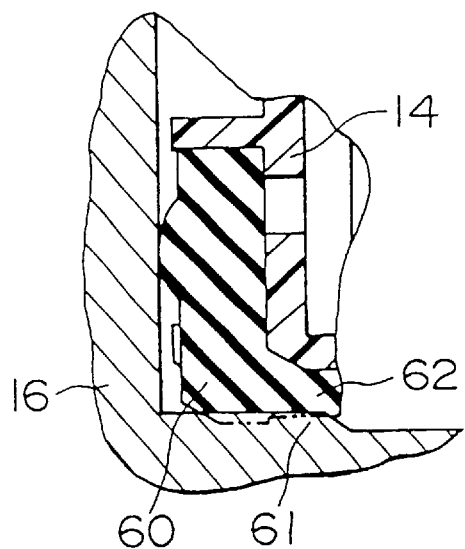
FIG. 5 is an enlargement of area B in FIG. 1.

FIG. 5 is an enlargement of area B in FIG. 1. Elastic members 60 made of rubber are disposed between the housing 16 and the brush holder 14 in four places at even pitch. A stepped portion 61 is formed on the radially inner wall of the housing 16.

When each of these elastic members 60 are installed between the housing 16 and the brush holder 14, an outer circumferential portion 62 thereof extends beyond the stepped portion 61 and is elastically deformed. The brush holder 14 is pressed towards the shaft 9 from four directions by this elastic force, positioning the brush holder 14 relative to the shaft 9 without bias.

Furthermore, the four elastic members 60 are also elastically deformed between the bottom surface of the brush holder 14 and the housing 16. The brush holder 14 is also pressed in the direction of the axis of the shaft 9 from four places by this elastic force. When a force inclined relative to the shaft 9 acts on the brush holder 14 from outside, tilting is suppressed by the pressure of the elastic force. Moreover, by disposing the evenly-pitched elastic members 60 at an angle of 45 to the opposing elastic bodies 100, positioning and prevention of tilting of the brush holder 14 can be improved.

Figure 6:
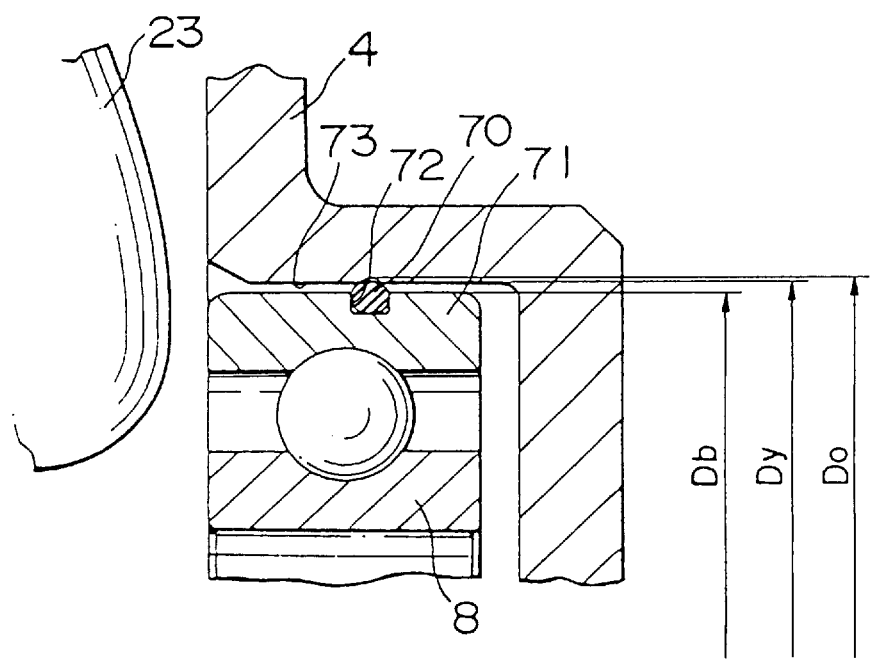
FIG. 6 is an enlargement of area C in FIG. 1.

FIG. 6 is an enlargement of area C in FIG. 1. A recess 72 is formed in the outer wheel of the first bearing 8. An 0-ring 70 is inserted into the recess 72 as an impact preventing member. The relationship Db<Dy<Do is satisfied, where Db is the outside diameter of the first bearing 8, Dy is the inside diameter of the yoke 4, and Do is the outside diameter of the O-ring 70 before deformation. For that reason, the O-ring 70 is compressed when it is installed between the recess 72 and the inner wall 73 of the bearing housing portion 7 of the yoke 4, enabling the noise of the first bearing 8 knocking against the yoke 4 to be reduced, thus enabling vibrations and noise in the yoke 4 to be reduced.

Furthermore, because rattling of the armature 10 is reduced, brush noise can be more effectively reduced.

Moreover, the O-ring 70 is not limited to one, two or more may also be used, and an O-ring may also be disposed between the first bearing 8 and the shaft 9 as an impact preventing member.

Figure 7:
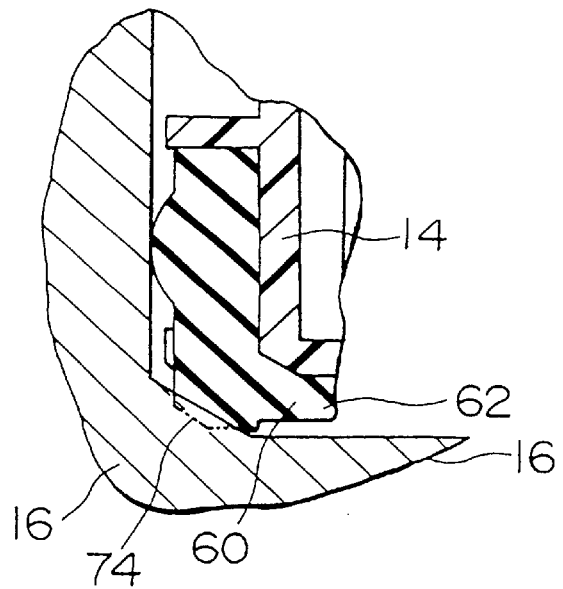
FIG. 7 is a diagram showing a variation of the housing in FIG. 1.

Furthermore, an inclined face 74 may also be formed on the inside corner of the bottom surface of the housing 16, as shown in FIG. 7. In this case, the elastic members 60 can be smoothly installed between the housing 16 and the brush holder 14 because the outer circumferential portions 62 of the elastic members 60 are not pressed against the radially inner wall of the housing 16.

Embodiment 2

Figure 8:
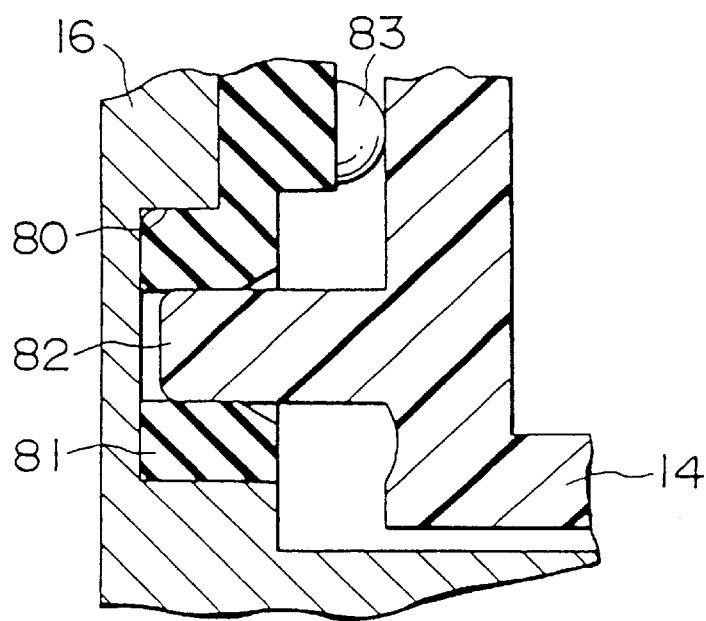
FIG. 8 is a partial cross-section of a commutator motor according to Embodiment 2 of the present invention.

FIG. 8 is a partial cross-section of a commutator motor according to Embodiment 2 of the present invention.

In this embodiment, a recess 80 is formed on the bottom surface of the housing 16 as an engaging member. A protrusions 82 is inserted into the recess 80 by means of an elastic member 81 as a rod-shaped engaged portion extending from the brush holder 14 in the direction of the axis of the shaft 9. A hemispherical support portions 83 is formed on the side of the elastic member 81 closest to the brush holder 14 to contact the brush holder 14 and prevent the brush holder 14 from tilting.

In this embodiment, because the protrusion 82 is inserted into the recess 80 by means of an elastic member 81, it is possible to position the brush holder 14 circumferentially and center it simultaneously when installing the brush holder 14 in the housing 16, and the brush holder 14 will not move easily even if subjected to an external force.

Moreover, a protrusion may be formed in the housing, and a recess or aperture for receiving the protrusion may be formed in the brush holder.

Embodiment 3

Figure 9:
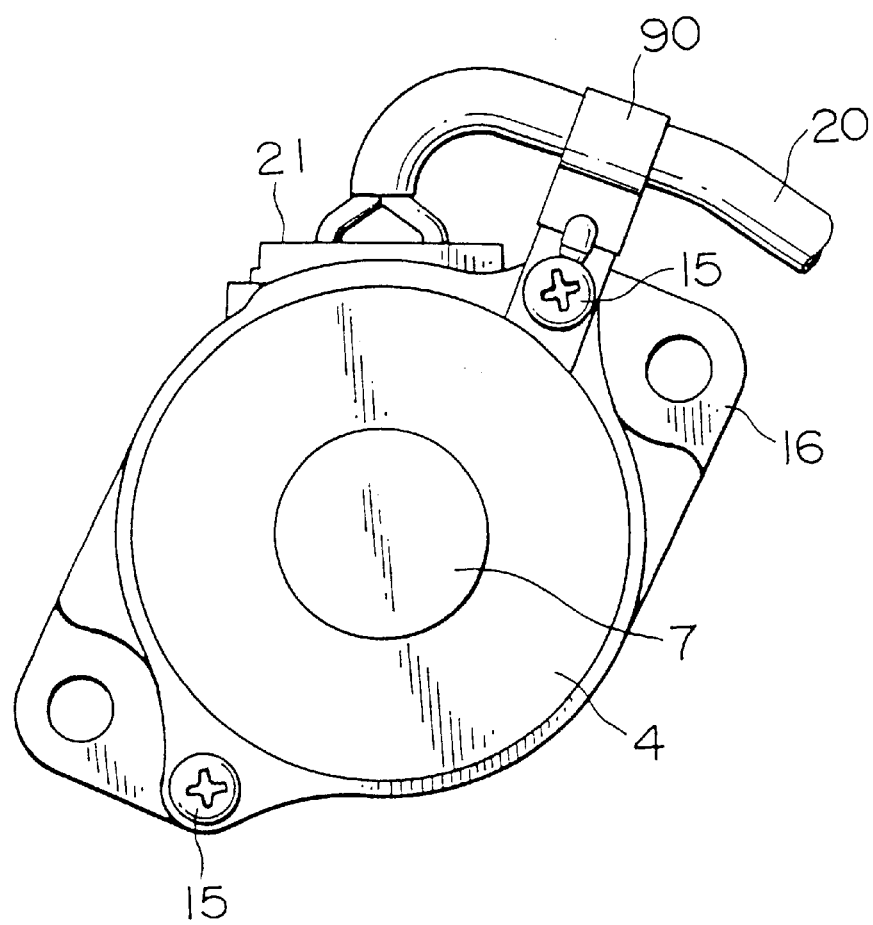
FIG. 9 is an external view of a commutator motor according to Embodiment 3 of the present invention.
Figure 10:
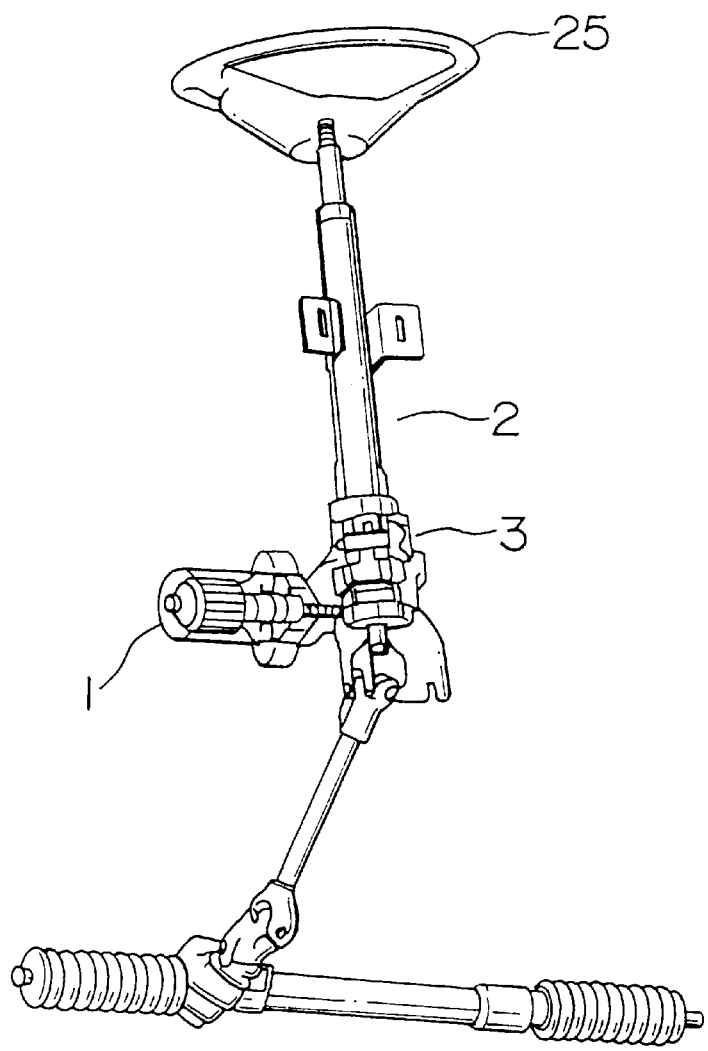
FIG. 10 is a diagram showing use of a conventional commutator motor.
Figure 11:
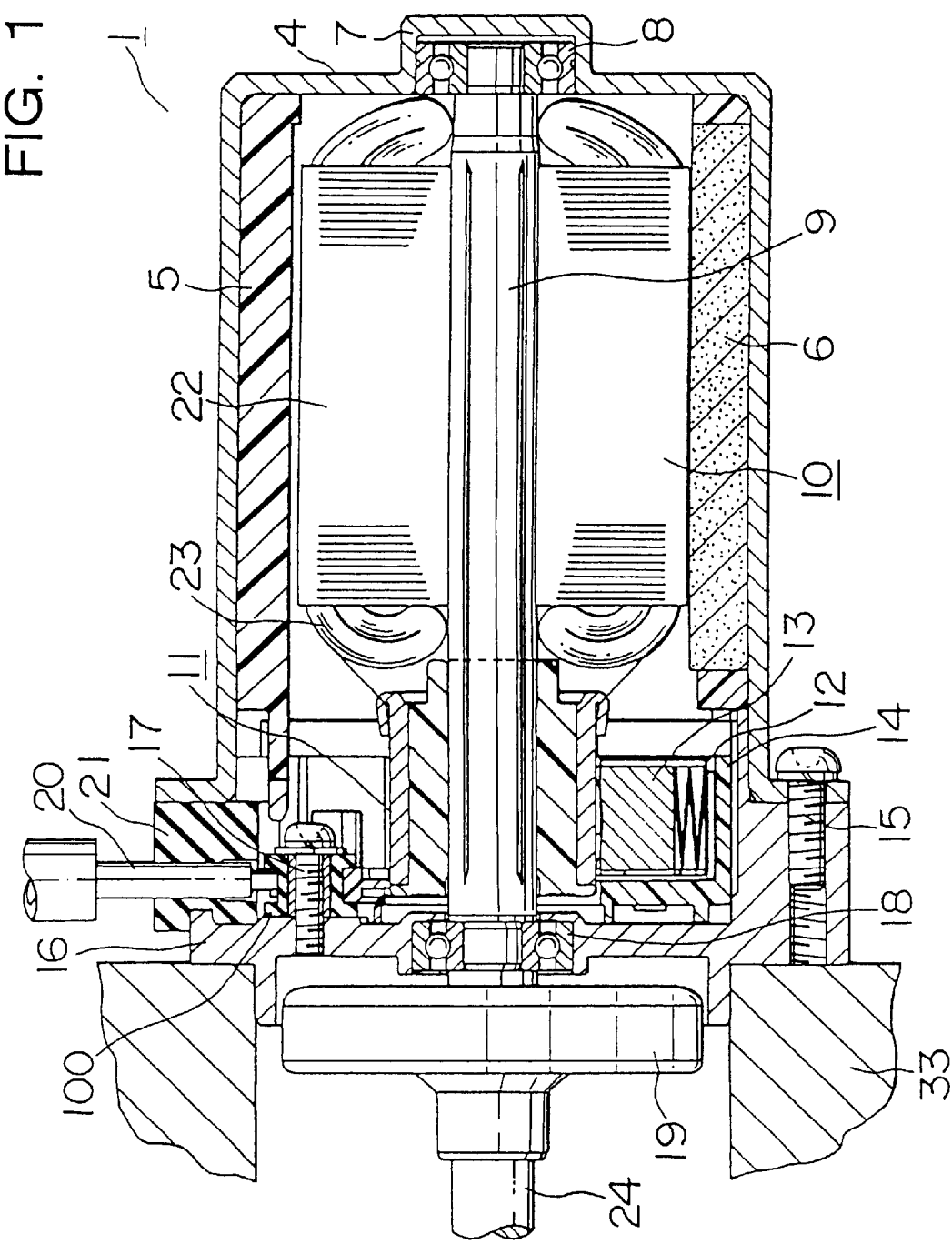
FIG. 11 is a lateral section of a conventional commutator motor.
Figure 12:
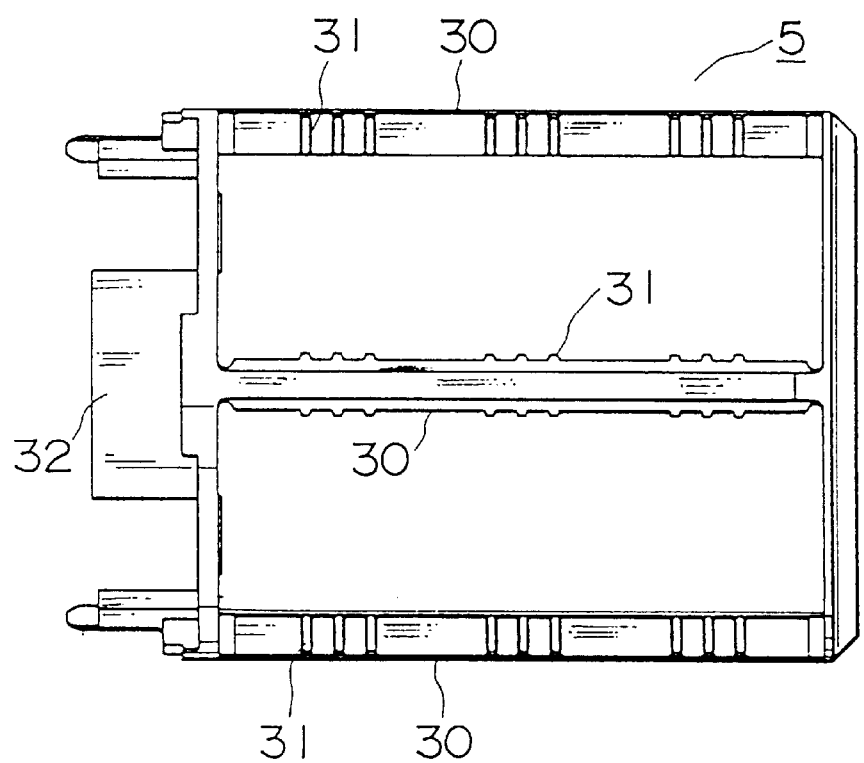
FIG. 12 is a side elevation of the magnet holder in FIG. 11.
Figure 13:
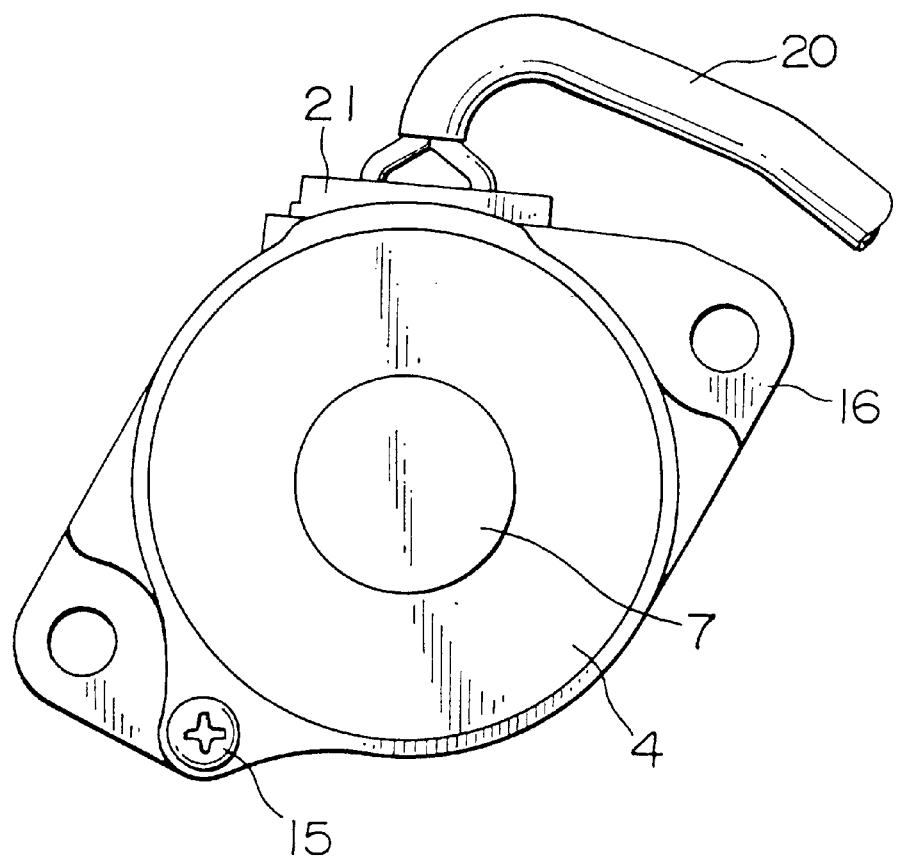
FIG. 13 is an external view of a conventional commutator motor.

FIG. 9 is a side elevation of a commutator motor according to Embodiment 3 of the present invention. A lead clamp 90 for securing the lead wire 20 is mounted to the yoke 4.

For that reason, external force is not easily transmitted to the brush holder 14 through the lead wire 20, preventing the brush holder 14 from being moved by an external force. Moreover, if the lead clamp 90 is close to the grommet 21, the floating effect of the brush holder 14 is reduced, reducing effect of brush noise reduction.

As explained above, a commutator motor according to one aspect of the present invention comprises: a cylindrical yoke; magnets disposed opposite each other inside the yoke; a shaft disposed on the central axis of the yoke so as to rotate freely; an armature secured to the shaft; a commutator secured to one end of the shaft; brushes placed in contact with the surface of the commutator by the elastic force of springs; a brush holder for holding the brushes; and a housing mounted to the yoke, the brush holder being supported on the housing by means of an elastic body, and an elastic member for positioning the central axis of the brush holder so as to be aligned with the central axis of the shaft being disposed between the housing and the brush holder. Therefore, vibrations from the housing to the brush holder and brush sliding noise is absorbed by elastic bodies and elastic members, reducing the occurrence of brush noise due to vibration of the brushes.

Furthermore, displacement of the brush holder can be prevented, and good contact between the brushes and the commutator can be ensured, reducing brush noise and improving the performance of the commutator motor.

Furthermore, when shaky rotation occurs in the commutator, for example, because the brush holder follows the fluctuations, brush noise can be reduced.

According to one form of the commutator motor, a plurality of the elastic members may be disposed between the outer circumferential surface of the brush holder and the housing. Therefore, displacement of the brush holder can be prevented by directing the brush holder towards the central axis of the shaft According to another form of the commutator motor, a plurality of the elastic members may be disposed between the outer circumferential surface and bottom surface of the brush holder and the housing. Therefore, displacement and tilting of the brush holder can be suppressed.

According to still another form of the commutator motor, the elastic member may be disposed between an engaging portion formed in the housing and a receiving portion engaged by the engaging portion formed in the bottom surface of the brush holder. Therefore, it is possible to position the brush holder circumferentially and center it simultaneously when installing the brush holder in the housing, improving the assembly operation, and the brush holder will not move easily even if subjected to an external force, ensuring good contact between the brush and the commutator.

According to one form of the commutator motor, a support portion for contacting the bottom surface of the brush holder and preventing the brush holder from tilting is disposed on the elastic member. Therefore, tilting of the brush holder can be more reliably suppressed.

According to one form of the commutator motor, an inclined surface against which the elastic member is pressed may be formed on an inside corner portion of the bottom surface of the housing. Therefore, the elastic members can be smoothly installed between the housing and the brush holder because the outer circumferential portions of the elastic members are not pressed against the radially inner wall of the housing.

According to another form of the commutator motor, an impact preventing member for preventing impact with the shaft or with the yoke may be disposed on a bearing supporting the shaft so as to rotate freely. Therefore, the generation of impact noise can be reduced. Increases in brush noise due to rattling of the armature can also be suppressed.

According to still another form of the commutator motor, the impact preventing member may be an O-ring. Therefore, the generation of impact noise can be reduced inexpensively by a simple construction.

According to another form of the commutator motor, a magnet holder for holding the magnets may be fastened to a member in the vicinity of the brush holder. Therefore, vibrations from the yoke side may be transmitted to the housing but are not directly transmitted to the brush holder which would otherwise cause brush noise.

According to still another form of the commutator motor, a lead wire whose tip is connected to a metal fitting in the brush holder may be secured by a lead clamp. Therefore, external force is not easily transmitted to the brush holder through the lead wire, preventing the brush holder from being moved by external force.

According to another form of the commutator motor, the commutator motor may be a motor for an electric power steering assembly. Therefore a driver can drive comfortably even if the motor is inside the cab of the vehicle.

What is claimed is:

1. A commutator motor comprising:

a yoke having a central axis;

magnets disposed opposite each other inside said yoke;

a housing mounted to said yoke;

a shaft disposed on the central axis of said yoke so as to rotate freely;

an armature secured to said shaft;

a commutator secured to said shaft;

a brush holder secured to said housing via an elastic body;

brushes supported by said brush holder and placed in contact with said commutator by elastic force of springs; and an elastic member, for positioning a central axis of said brush holder so as to be aligned with a central axis of said shaft, being disposed between said housing and said brush holder, said elastic member being different from said elastic body.

2. The commutator motor according to claim 1, wherein a plurality of said elastic members are disposed between an outer circumferential surface of said brush holder and said housing.

3. The commutator motor according to claim 1, wherein a plurality of said elastic members are disposed between an outer circumferential surface and a bottom surface of said brush holder and said housing.

4. The commutator motor according to claim 3, wherein said housing has a bottom surface from which extends an inclined surface that presses against said elastic member.

5. The commutator motor according to claim 1, wherein said elastic member is disposed between an engaging portion formed in said housing and a receiving portion engaged by said engaging portion formed in a bottom surface of said brush holder.

6. The commutator motor according to claim 1, wherein said elastic member includes a support portion contacting a bottom surface of said brush holder that prevents said brush holder from tilting.

7. The commutator motor according to claim 1, wherein an impact preventing member for preventing impact with said shaft or with said yoke is disposed on a bearing supporting said shaft.

8. The commutator motor according to claim 7, wherein said impact preventing member is an O-ring.

9. The commutator motor according to claim 1, wherein a magnet holder for holding said magnets is fastened to a member in the vicinity of said brush holder.

10. The commutator motor according to claim 1, wherein a lead wire is connected to a metal fitting in said brush holder, and secured by a lead clamp mounted on said commutator motor.

11. The commutator motor according to claim 1, wherein said commutator motor is a motor for an electric power steering assembly.

* * * * *